(12) United States Patent
Ueno et al.

(10) Patent No.: US 6,347,890 B2
(45) Date of Patent: Feb. 19, 2002

(54) OPTICAL FERRULE

(75) Inventors: Takahiro Ueno; Koichi Maeno; Masayuki Ishiwa, all of Hiratsuka; Katsuki Suematsu, Ichihara, all of (JP)

(73) Assignee: Furakawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/742,712

(22) Filed: Dec. 20, 2000

(30) Foreign Application Priority Data

Dec. 17, 1999 (JP) .......................... 11-359116

(51) Int. Cl.[7] ................................. G02B 6/40
(52) U.S. Cl. .................. 385/78; 264/1.25; 425/116
(58) Field of Search ................... 385/78–88, 147; 264/1.7, 2.7, 272.15, 275, 328.1, 1.25; 425/116, 125, 190, 444, 468, 556, 557, DIG. 10

(56) References Cited

U.S. PATENT DOCUMENTS 5,482,451 A * 1/1996 Johnson et al. ............. 425/116
5,568,581 A * 10/1996 Johnson et al. ............... 385/78
5,587,116 A * 12/1996 Johnson et al. ............. 264/1.25

FOREIGN PATENT DOCUMENTS

JP          06-299072          10/1994

* cited by examiner

Primary Examiner—Akm E. Ullah
(74) Attorney, Agent, or Firm—Knobbe, Martens, Olson & Bear, LLP

(57) ABSTRACT

An optical ferrule is a molding of a resin composition comprising a base resin, silica, and whisker, as essential components. The resin composition has a melt viscosity of 300 to 600 [Paxsec.] when measured at a shear rate of 900 [1/sec.] at a temperature of 340° C. by using a capillary having a diameter of 0.1 mm and a depth of 30 mm as defined by JIS-K-7199. Preferably, the base resin is a linear polyphenylene sulfide resin, and 250 to 300 parts by weight of silica and 10 to 70 parts by weight of whisker are blended with 100 parts by weight of the linear polyphenylene sulfide resin.

8 Claims, 2 Drawing Sheets

OPTICAL FERRULE

BACKGROUND OF THE INVENTION

1. Field of the Invention

This invention relates to an optical ferrule, and more particularly, to an optical ferrule for establishing an optical connection between optical fibers without causing an optical loss.

2. Description of the Related Art

To connect optical fibers in a light communication system, a mono filamentary ferrule and a multistrand MT-type ferrule are employed, both of which are formed of a resin molding.

As shown in FIG. 1, mono filamentary ferrules 10 joined at their connecting end faces 1a are fixedly connected to each other by means of an adapter 4, thereby establishing a connection between optical fibers respectively inserted in advance into fiber core insertion holes (more generally, optical fiber insertion holes) 1b of the ferrules.

As shown in FIG. 2, a multistrand MT-type ferrule comprises a ferrule body 1 that is formed into one piece and formed with a plurality of optical fiber insertion holes 1b and guide pin holes 2 having an inner diameter of about 125 µm. In establishing a connection between optical fibers, the optical fibers inserted into the optical fiber insertion holes 1b are fixedly bonded therein by an adhesive, and then connecting end faces 1a of ferrule bodies 1 of ferrules 10 are polished to a mirror-finished surface by using, for example, a lubricating oil having diamond abrasive grains dispersed therein. Next, guide pins 3 are inserted into the guide holes 2 of the ferrules 10, and the connecting end faces of the ferrule bodies are abutted together, to thereby establish optical connection between the optical fibers.

In the case of the MT-type ferrule of this type, if the positional and dimensional accuracies of the guide pin holes are degraded, the optical axes of connected optical fibers are declined when the ferrule bodies are abutted together, which causes a large optical loss. Thus, it is necessary to form the guide pin holes in the ferrule body 1 with high accuracy. The mono filamentary ferrule is also required to be molded with high dimensional accuracy to reduce the optical loss since the connection accuracy of the optical fibers and the degree of optical loss are determined by the roundness and cylindricity of the periphery of the ferrule, the concentricity between the outer diameter of the ferrule and the optical fiber insertion hole, and the perpendicularity of the optical fiber insertion hole.

Conventionally, in order to mold optical ferrules with high accuracy, transfer molding of a resin (for example, a thermosetting resin such as an epoxy resin) that is small in the rate of mold shrinkage and has a high dimensional stability against aging has been employed for the production of optical ferrules. However, transfer molding takes time to thermally cure the resin filled in a mold, requiring a long molding cycle time, and hence it is not suited to mass production.

To obviate the problems, there has been recently proposed a technique in which a polyphenylene sulfide resin that is excellent in dimensional stability, high fluidity, and environmental resistance is subjected to injection molding which has a short molding cycle time. In this case, polyphenylene sulfide is ordinarily filled with a large amount of silica so as to make the thermal expansion coefficient of the molded ferrule and that of optical fibers close to each other, thereby reducing thermal stress generated in the ferrule. However, the silica filled in the resin is liable to fall off during the polishing of the connecting end face of the ferrule made of such a molding material, which makes it difficult to obtain a smoothed connecting end face.

To eliminate this problem, a method is proposed in which silica is subjected to surface-treatment by a silane coupling agent before it is filled in the resin, and a mixture of spherical silica and irregular-shaped silica is used as silica, to thereby prevent fall-off of silica (see Japanese Unexamined Patent Publication No. 6-299072). However, the proposed method still has the following problems:

First, the smoothness of the polished connecting end faces is insufficient, which makes it difficult to realize an excellent optical connection between optical fibers only by physical contact, i.e., by physically abutting the connecting end faces of the ferrules against each other.

Therefore, in connecting ferrules, conventionally, a matching agent such as silicone paste is applied to the polished end faces to prevent a change in refractive index, i.e., occurrence of an optical loss, from being caused in the gap between the optical fibers. However, the application of a matching agent must be carefully carried out so as not to allow dust or dirt to enter into the applied portion. Depending on the manner of applying the matching agent, bubbles may be produced in the agent applied portion to cause a markedly large optical loss. For these reasons, it is desired to develop ferrules which allow end faces of optical fibers to be connected to each other, without using a matching agent, i.e., solely by physical contact, such that no gap is formed between the optical fibers, thereby preventing occurrence of optical loss.

To establish a proper physical contact of ferrules, optical fibers are required to have ends thereof protruding from the polished end faces of the ferrules by about two to three µm.

In the case of the optical ferrule obtained by molding a resin filled with a large amount of silica, the connecting end face of the ferrule itself is hard since the hardness of silica is close to that of the optical fiber. Hence, the connecting end face of the optical fiber and that of the optical ferrule are both equally polished away, so that the length of protrusion of the optical fiber from the polished end face of the optical ferrule tends to become smaller than the required value. In such a case, a gap is produced between the connecting end faces of the optical fibers to cause a markedly large optical loss.

Further, MT-type optical ferrules are adapted to be connected via the guide pins that are inserted into the guide pin holes of the ferrule bodies, so that the guide pin holes may be damaged or broken if the operations of connecting and disconnecting the ferrules by fitting and removing the guide pins to and from the guide pin holes are repeated. This makes it impossible to carry out the connecting operation.

SUMMARY OF THE INVENTION

It is an object of this invention to provide an optical ferrule that is excellent in smoothness of a connecting end face and allows an optical fiber to have a suitable length of protrusion from the connecting end face, whereby a connecting operation can be effected without using a matching agent and an optical loss between connected optical fibers can be reduced, with the optical ferrules hardly damaged even if it is subjected to repeated physical contact.

The present inventors made intensive study for attaining the above object, and found that when an optical ferrule is manufactured by injection molding, an intended optical ferrule can be obtained if a resin composition containing not only silica but also the below-mentioned whisker and exhibiting the below-mentioned melt viscosity is used as a molding material. Based on the finding, the present inventors have developed an optical ferrule of this invention.

According to the present invention, there is provided an optical ferrule which is a molding of a resin composition and which has an optical fiber insertion hole and a polished connecting end face. The resin composition contains, as essential constituents, a base resin, silica, and whisker.

The optical ferrule of this invention obtained by molding the aforementioned resin composition is not prone to produce burrs during the molding, has a high dimensional accuracy, is excellent in smoothness of the polished connecting end face thereof, and ensures an appropriate length of protrusion of an optical fiber from the polished end face. This makes it possible to realize physical contact between the ferrule and another ferrule without causing optical loss between optical fibers held by the ferrules, by abutting the polished end faces of the ferrules together. Further, the optical ferrule has an excellent strength property. This makes it possible to eliminate or greatly reduce the possibility of breakage of a guide pin hole to which a guide pin is fitted and removed therefrom, even if MT-type optical ferrules of this invention are subjected to repeated connection and disconnection.

In the present invention, preferably, the base resin is a linear polyphenylene sulfide resin. With this preferred embodiment, the molding (optical ferrule) of the resin composition is not prone to produce burrs, and ensures a high failure strength of the optical fiber insertion hole and guide pin hole formed in the ferrule and a small dimensional variation of the ferrule.

The resin composition has a melt viscosity of 300 to 600 [Pa×sec.] when measured at a shear rate of 900 [1/sec.] at a temperature of 340° C. by using a capillary having a diameter of 0.1 mm and a depth of 30 mm, as defined by JIS-K-7199.

Preferably, the linear polyphenylene sulfide resin exhibits a peak top value of 20000 to 40000 in a molecular weight distribution as measured by gel permeation chromatography. Such a linear polyphenylene sulfide resin is suitable for the base resin.

Preferably, the resin composition is comprised of 250 to 300 parts by weight of silica blended with 100 parts by weight of the linear polyphenylene sulfide resin. Preferably, 10 to 70 parts by weight of whisker are blended with 100 parts by weight of the linear polyphenylene sulfide resin. The molding (optical ferrule) of the resin composition according to these preferred embodiments is excellent in strength and molding accuracy.

Preferably, the silica in the resin composition is a mixture of spherical silica and irregular-shaped silica. More preferably, the blending ratio of the spherical silica to the entire silica is 50 to 80% by weight, and that of the irregular-shaped silica is 20 to 50% by weight. With these embodiments, a large amount of silica can be filled into the resin composition, without causing the increase in viscosity of the resin composition, thereby reducing the dimensional mold shrinkage.

Preferably, the whisker is of a kind having a hardness smaller than that of an optical fiber inserted into the optical fiber insertion hole. With this preferred embodiment, the polished connecting end face of the optical ferrule is excellent in smoothness, and an appropriate length of protrusion of the optical fiber from the polished end face is ensured, whereby a connection between optical fibers can be established with a low optical loss by physical contact.

Preferably, the whisker is comprised of at least one material selected from a group consisting of potassium titanate, titanium oxide, magnesium hydroxide needles, wollastonite, xonotlite, dawsonite, and calcium carbonate needles. The whisker according to this preferred embodiment has a hardness smaller than that of an optical fiber and is excellent in polishability, whereby an appropriate connection can be made between optical fibers.

Preferably, the whisker has an average fiber diameter of 5 to 20 μm, an average fiber length of 30 μm or less, and an aspect ratio of 10 or larger. The resin composition of this embodiment is excellent in molding accuracy.

DETAILED DESCRIPTION OF PREFERRED EMBODIMENTS

Figure 1:
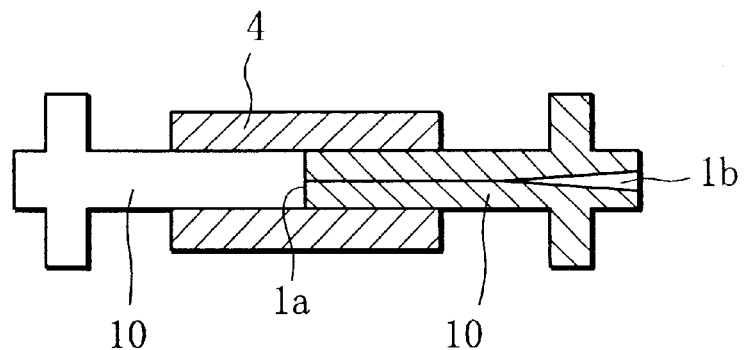
FIG. 1 is a schematic view, showing partly in cross section, of a joint of optical ferrules for mono filamentary.

The optical ferrule of the present invention is a molding that is manufactured by subjecting a resin composition to molding, preferably, injection molding. The resin composition contains, as essential constituents, a base resin, silica, and whisker. The optical ferrule of this invention can be realized in various forms. For example, it is realized in the form of a mono filamentary optical ferrule shown in FIG. 1 or an MT-type optical ferrule shown in FIG. 2.

As the resin composition of the optical ferrule, a resin composition is used, which exhibits a melt viscosity of 300 to 600 [Pa×sec.] as measured by a method defined by JIS-K-7199. More specifically, the resin composition exhibits an apparent viscosity of 300 to 600 [Pa×sec.] when measured using a capillary rheometer defined by JIS-K-7199, by extruding a resin composition molten to a temperature of 340° C. through a capillary having a diameter of 0.1 mm and a depth of 30 mm at a shear rate of 900 [1/sec.].

When a resin composition is filled into a mold to obtain a molding of an MT type optical ferrule, if the melt viscosity of the resin composition is high, there occurs a difficulty in filling the resin composition into the mold at a high speed, and further, load is applied to core pins, arranged within the mold, for forming guide pin holes, which may degrade the dimensional accuracy of the molded product. Therefore, it is preferred that the resin composition has a low melt viscosity. However, if the melt viscosity of the resin composition is too low, burrs are likely to be produced in the resulting molding or ferrule.

For these reasons, according to the present invention, kinds of essential constituents of the resin composition are selected and a blending quantity of each constituent is adjusted such that the melt viscosity of the resin composition falls within the aforementioned appropriate range.

The base resin of the resin composition is not particularly limited so long as the resin composition obtained by blending the base resin with silica and whisker exhibits the aforementioned melt viscosity characteristic. However, a linear polyphenylene sulfide resin is preferred for the following reasons:

The linear polyphenylene sulfide resin is not prone to produce burrs when it is molded into articles (optical ferrules) by injection molding even if it has a low viscosity, and the resulting molding has a high toughness, so that optical fiber insertion holes and guide pin holes formed in the molded ferrule have a high failure strength. Further the resin composition is low in hygroscopicity. The molded ferrule which contains, as the base resin, the linear polyphenylene sulfide resin having a low hygroscopicity undergoes very little change in dimension even under circumstances of high temperature and high humidity. This is advantageous in that a variation in a connected state of ferrules is kept small after the connection between the ferrules is established.

In general, a polyphenylene sulfide resin can be synthesized, for example by a method of increasing a molecular weight by polymerization reaction until the resulting substance is insolubilized, or by a method of increasing a molecular weight by thermal crosslinking until the resulting substance is insolubilized, or by a method of processing by using a crosslinking agent such as hydrogen peroxide. The linear polyphenylene sulfide for use as the base resin of the present invention is synthesized as a resin which has been polymerized into one dimensional linear polyphenylene sulfide without carrying out thermal processing during the synthesis process described above.

As the linear polyphenylene sulfide resin, it is preferable to use a linearly-polymerized resin that exhibits a peak top value of 20000 to 40000 in a molecular weight distribution as measured by gel permeation chromatography (hereinafter referred to as "GPC") using 1-chrolo naphthalene at a temperature of 230 to 290° C. as a solvent, and that exhibits a melt viscosity of 300 to 500 [Pa×sec.] when measured at a temperature of 340° C. at a shear rate of 900 [1/sec.] by means of a capillary having a diameter of 0.1 mm and a depth of 30 mm. More specifically, there may be mentioned a product manufactured by TOHPREN Co. Ltd., under a trade name of T-1.

By blending silica and whisker with the base resin, the resin composition used in the present invention and having the above-defined melt viscosity is prepared. Kinds and blending quantities of silica and whisker are determined from the view point of attaining the appropriate strength property of the molded optical ferrule and the appropriate length (about 2 to 3 $\mu$m) of protrusion of an optical fiber from the polished connecting end face of the ferrule.

As to the silica to be filled in the resin composition, there may be employed either irregular-shaped silica or spherical silica, or a mixture of them.

As the irregular-shaped silica, crystalline silica prepared to a predetermined size distribution by pulverizing natural silica, for example Crystallite manufactured by Tatsumori LTD., may be used. Also, fused silica obtained by pulverizing natural silica after once melting the same, for example Fuselex manufactured by Tatsumori LTD., may be used. Grains of these kinds of irregular-shaped silica are different in size and have complicated irregular surfaces.

On the other hand, the spherical silica to be filled in the resin composition may be manufactured by a so-called flame fusion method in which natural silica or crystal is once pulverized by means of a ball mill or the like, and then the resulting powder is sprayed, for example into LPG-oxygen flames to melt and liquefy each particle to allow the same to take a spherical form by surface tension. As such spherical silica, there may be mentioned FB-series products manufactured by Denki Kagaku Kogyo Kabushiki Kaisha.

This spherical silica is spherical in shape, and small in specific surface compared with irregular-shaped silica, so that even if it is blended with the base resin in a relatively large amount or proportion, the resulting resin composition has a smaller increase in viscosity than when irregular-shaped silica is used, and hence spherical silica can make the resin composition suitable for injection molding.

Further, the fact that a relatively large amount of silica can be blended while meeting the requirement of suppressing an increase in viscosity of the resulting resin composition means that optical ferrules molded therefrom have a reduced thermal expansion coefficient. Therefore, the use of spherical silica ensures dimensional stability of a joint of the ferrules even if the joint is exposed to changes in temperature, thereby providing an advantageous effect of making an optical loss less liable to occur.

Preferably, such silica is blended in an amount of 250 to 300 parts by weight relative to 100 parts by weight of linear polyphenylene sulfide when the linear polyphenylene sulfide resin is used as the base resin.

If the amount of silica is made smaller than 250 parts by weight, the strength property of the molded optical ferrule is degraded. For example, when the ferrule is fixed by chucking for polishing the end face thereof, the end face is deformed, which makes it difficult to obtain an accurate length of protrusion of an optical fiber. Further, the rate of mold shrinkage is large. If the mount of silica is made larger than 350 parts by weight, the melt viscosity of the resin composition increases, so that the pressure required to fill the resin composition into a mold becomes so high that the molding is degraded in dimensional accuracy.

If the amount of silica is set to a value falling within the above-defined appropriate range, burrs produced around inner rims of the guide pin holes during the polishing of the end face of molded ferrule are brittle Thus, the burrs are easily scraped off by the guide pins that are inserted into the guide pin holes when the ferrules are abutted against each other via the guide pins, whereby physical contact can be established without causing an optical loss.

Either the above-mentioned spherical silica or irregular-shaped silica may be used singly, but the use of a mixture of them is suitable since irregular-shaped silica enters between gaps of spherical silica particles, thereby realizing a state of silica being highly filled as a whole without causing an increase in viscosity of the resin composition, thereby reducing the rate of dimensional mold shrinkage.

When a mixture of spherical silica and irregular-shaped silica is used, it is preferred that 50 to 80% by weight of spherical silica (together with 20 to 50% by weight of irregular-shaped silica) is blended with the base resin, with the amount or proportion of a blend of the whole silica being set to the above-defined appropriate range.

In the case of optical ferrules made of a resin composition containing only silica having about the same Mohs' hardness as the optical fiber, a connecting end face of an optical fiber may be damaged during polishing or the length of protrusion of the optical fiber may be too small, as mentioned in the above.

To alleviate the phenomenon of an end face of an optical fiber being damaged or length of protrusion of the same becoming inappropriate, the resin composition of this invention contains whisker as an essential constituent. It is preferable that the whisker is of a kind which has a hardness smaller than that of optical fibers. Assuming that the hardness of whisker is larger than that of optical fibers, when end faces of ferrules are polished, whisker may remain unpolished on the polished end faces, thereby blocking intimate contact of the ferrules when they are connected to each other at their polished end faces. Even if whisker is polished away, chips or shavings produced by polishing may cause surface flaws on the polished faces of optical fibers to increase an optical loss at a joint of the optical fibers.

Therefore, that kind of whisker is preferable which has a smaller hardness and a superior polishability than optical fibers. Preferred examples of such whisker comprise any of potassium titanate, titanium oxide, magnesium hydroxide needles, wollastonite, xonotlite, dawsonite, and calcium carbonate needles, and have a Mohs' hardness of 4 to 5. These whisker construction materials may be used singly. Alternatively, two or more of them may be used in combination.

It is preferred that whisker has an average fiber diameter of 5 to 20 $\mu$m, an average fiber length of 30 $\mu$m or less, and an aspect ratio of 10 or larger. If whisker of a kind having such a shape and dimensions is used, the resulting optical ferrule is less liable to anisotropic mold shrinkage, thereby ensuring a high accuracy of the molding.

The amount or proportion of a blend of whisker is preferably 10 to 70 parts by weight relative to 100 parts by weight of a linear polyphenylene sulfide resin for use as the base resin.

If the amount of a blend of whisker is made smaller than 10 parts by weight, the molded ferrule can be degraded in strength property to have an end face thereof deformed by polishing, as in the case of silica, and the above-mentioned advantageous effects cannot be fully obtained. If the amount of a blend of whisker is made larger than 70 parts by weight, the moldability of the resulting resin composition is degraded to make it difficult to obtain an optical ferrule having a high dimensional accuracy.

EXAMPLES 1 TO 9 AND COMPARATIVE EXAMPLES 1 TO 11

(1) Preparation of a resin composition for optical ferrules

First, as materials for resin compositions, the following were prepared:

A. Base resin $A_1$: T-1 (trade name: linear polyphenylene sulfide resin manufactured by TOHPREN Co. Ltd.)

$A_2$: T-3AG (trade name: linear polyphenylene sulfide resin manufactured by TOHPREN Co. Ltd.)

B. Silica $B_1$: TTS-4 (trade name: spherical silica manufactured by Tatsumori LTD.; average particle diameter of 3.0 $\mu$m)

$B_2$: 5X (trade name: irregular-shaped silica manufactured by Tatsumori LTD.; average particle diameter of 1.0 $\mu$m)

$B_3$: RD-8 (trade name: irregular-shaped silica manufactured by Tatsumori LTD.; average particle diameter of 13 $\mu$m)

$B_4$: MCF-200C (trade name: irregular-shaped silica manufactured by Tatsumori LTD.; average particle diameter of 12 $\mu$m)

$B_5$: E20 (trade name: irregular-shaped silica manufactured by Tatsumori LTD.; average particle diameter of 7.0 $\mu$m)

C. Whisker $C_1$: whisker of potassium titanate having an average fiber diameter of 0.5 $\mu$m, an average fiber length of 20 $\mu$m, and an aspect ratio of 30.

$C_2$: whisker of magnesium hydroxide needles having an average fiber diameter of 1 $\mu$m, an average fiber length of 20 $\mu$m, and an aspect ratio of 20.

$C_3$: whisker of wollastonite having an average fiber diameter of 1 $\mu$m, an average fiber length of 30 $\mu$m, and an aspect ratio of 30.

$C_4$: whisker of zonotlite having an average fiber diameter of 1 $\mu$m, an average fiber length of 30 $\mu$m, and an aspect ratio of 30.

$C_5$: whisker of dawsonite having an average fiber diameter of 1 $\mu$m, an average fiber length of 30 $\mu$m, and an aspect ratio of 30.

$C_6$: whisker of calcium carbonate needles having an average fiber diameter of 1 $\mu$m, an average fiber length of 30 $\mu$m, and an aspect ratio of 30.

The above materials were supplied, in proportions shown in Table 1, to an extruder set to a cylinder temperature of 280 to 330° C. and kneaded therein, whereby various resin compositions in pellet form were prepared.

Then, the melt viscosity of each resin composition was measured according to a method defined by JIS-K-7199. That is, each resin composition was filled into a shearing tester having a depth of 30 mm, a capillary hole diameter of 1.0 mm, and a piston diameter of 12 mm, and heated to 340° C. to melt, and then the melt viscosity was measured at a shear rate of 900 [1/sec.]. Results of the measurement are shown in Table 1.

TABLE 1

| | Composition | | | | | | | | |
|---|---|---|---|---|---|---|---|---|---|
| | Base resin | | Spherical silica | | Irregular-shaped silica | | Whisker | | Melt viscosity (Pa · sec) | Remark |
| | Kind | Proportion (Parts by weight) | Kind | Proportion (Parts by weight) | Kind | Proportion (Parts by weight) | Kind | Proportion (Parts by weight) | | |
| Resin composition $D_1$ | $A_1$ | 100 | $B_1$ | 200 | $B_2$ | 50 | $C_1$ | 50 | 390 | Resin composition (Example) |
| Resin composition $D_2$ | $A_1$ | 100 | $B_1$ | 200 | $B_2$ | 100 | $C_1$ | 50 | 520 | Resin composition (Example) |
| Resin composition $D_3$ | $A_1$ | 100 | $B_1$ | 200 | $B_2$ | 100 | $C_2$ | 50 | 530 | Resin composition (Example) |
| Resin composition $D_4$ | $A_1$ | 100 | $B_1$ | 200 | $B_2$ | 100 | $C_3$ | 50 | 520 | Resin composition (Example) |
| Resin composition $D_5$ | $A_1$ | 100 | $B_1$ | 200 | $B_2$ | 100 | $C_4$ | 50 | 510 | Resin composition (Example) |
| Resin composition $D_6$ | $A_1$ | 100 | $B_1$ | 200 | $B_2$ | 100 | $C_5$ | 50 | 530 | Resin composition (Example) |
| Resin composition $D_7$ | $A_1$ | 100 | $B_1$ | 200 | $B_2$ | 100 | $C_6$ | 50 | 540 | Resin composition (Example) |
| Resin composition $D_8$ | $A_1$ | 100 | $B_1$ | 150 | $B_2$ | 50 | $C_1$ | 50 | 330 | Resin composition (Example) |
| Resin composition $D_9$ | $A_1$ | 100 | $B_1$ | 230 | $B_2$ | 100 | $C_1$ | 30 | 530 | Resin composition (Example) |
| Resin composition $D_{10}$ | $A_2$ | 100 | — | — | $B_3$ | 165 | — | — | 680 | Resin composition (Comp. Ex.) |
| Resin composition $D_{11}$ | $A_2$ | 100 | — | — | $B_4$ | 200 | — | — | 770 | Resin composition (Comp. Ex.) |
| Resin composition $D_{12}$ | $A_2$ | 100 | — | — | $B_4$ | 250 | — | — | 820 | Resin composition (Comp. Ex.) |

TABLE 1-continued

| | Composition | | | | | | | | |
|---|---|---|---|---|---|---|---|---|---|
| | Base resin | | Silica | | | | Whisker | | |
| | | | Spherical silica | | Irregular-shaped silica | | | | |
| | Kind | Proportion (Parts by weight) | Kind | Proportion (Parts by weight) | Kind | Proportion (Parts by weight) | Kind | Proportion (Parts by weight) | Melt viscosity (Pa · sec) | Remark |
| Resin composition $D_{13}$ | $A_2$ | 100 | — | — | $B_4$ | 300 | — | — | 1100 | Resin composition (Comp. Ex.) |
| Resin composition $D_{14}$ | $A_2$ | 100 | $B_1$ | 200 | — | — | — | — | 770 | Resin composition (Comp. Ex.) |
| Resin composition $D_{15}$ | $A_2$ | 100 | $B_1$ | 250 | — | — | — | — | 880 | Resin composition (Comp. Ex.) |
| Resin composition $D_{16}$ | $A_1$ | 100 | — | — | $B_3$ | 165 | — | — | 300 | Resin composition (Comp. Ex.) |
| Resin composition $D_{17}$ | $A_1$ | 100 | — | — | $B_5$ | 250 | — | — | 820 | Resin composition (Comp. Ex.) |
| Resin composition $D_{18}$ | $A_1$ | 100 | — | — | $B_5$ | 300 | — | — | 2500 | Resin composition (Comp. Ex.) |
| Resin composition $D_{19}$ | $A_1$ | 100 | — | — | $B_4$ | 300 | — | — | 310 | Resin composition (Comp. Ex.) |
| Resin composition $D_{20}$ | $A_1$ | 100 | $B_1$ | 150 | $B_2$ | 100 | — | — | 270 | Resin composition (Comp. Ex.) |

(2) Evaluation of properties

Properties of the resin compositions shown in Table 1 and properties of optical ferrules made by using these resin compositions were evaluated according to a specification defined below:

1. Rate of mold shrinkage

With use of a mold whose temperature was controlled to 170° C., each resin composition in pellet form was subjected to injection molding at an injection pressure of 60 MPa at a temperature of 340° C., whereby a sheet whose target dimension was 50 mm for length, 50 mm for width, and 2 mm for thickness was molded. Then, the rate of mold shrinkage was calculated by multiplying the difference between the design dimension of the mold and a measured dimension of the molded sheet by a value of 100, and by dividing the thus obtained product by the design dimension of the mold. A target range of the rate of mold shrinkage was set to 0.6% or lower.

2. Smoothness of polished end face

Figure 2:
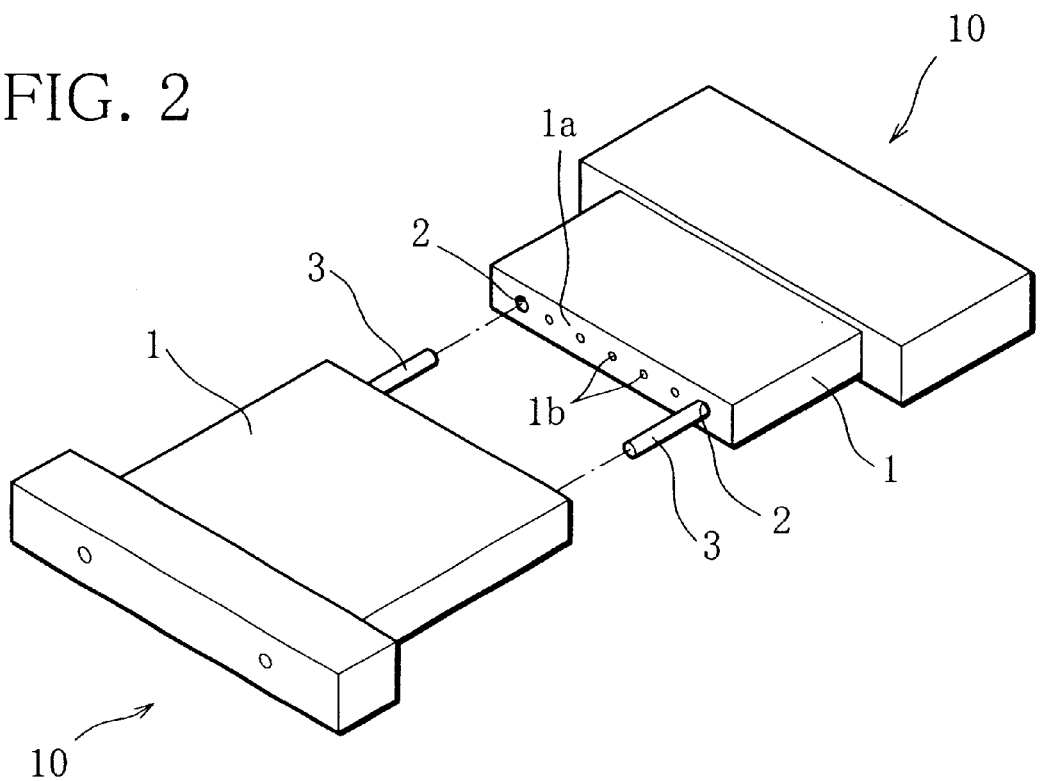
FIG. 2 is a schematic perspective view of MT-type ferrules.

With use of a mold for a ferrule body 1 shown in FIG. 2, each resin composition in pellet form was subjected to injection molding at a temperature of 340° C. An optical fiber was inserted into an optical fiber insertion hole of the obtained ferrule body 1 and bonded therein by means of an adhesive named Stycast (trade name: epoxy resin-based adhesive manufactured by Nippon Able Stick Co. Ltd.). Next, the ferrule was fixed by means of a collect chuck, and the end face of the ferrule was brought into contact with a grinding stone via a medium of lubricating oil containing abrasive grains of diamond, whereby the end face was polished while applying a constant load of 10 N thereto.

Then, a 10-point average roughness (Rz) on a straight line connecting two guide pin holes on the polished end face was measured according to JIS-B-0601, and the difference between the maximum and minimum values was obtained as a smoothness index. A target range of the smoothness index was set to 0.5 μm or smaller.

3. Length of protrusion of optical fiber

As in the case of the evaluation of smoothness, the ferrule body was prepared by injection molding, and an optical fiber was bonded therein by adhesive. Then, the ferrule body was fixed by a collect chuck, and the end face of the ferrule was brought into contact with a surface of a grinding stone, the number of which is #4000, at a constant load of 10 N, whereby the end face was polished via a medium of lubricating oil containing abrasive grains of diamond for one minute, and further, buffing was carried out for one more minute.

Then, the length of protrusion of the optical fiber from the polished face was measured by means of a surface-roughness tester. A target range of the protrusion length was set to 2.7 to 4.1 μm.

4. Bend elastic constant

Each resin composition in pellet form was subjected to injection molding at a temperature of 340° C. to form a test piece having a length of 80 mm, a width of 10 mm, and a thickness of 4 mm. The bend elastic constant of each test piece was measured by a method defined by JIS-K-7203. A target range of the bend elastic constant was set to 1.8 to $2.2 \times 10^4$ MPa.

5. Flexural strength

Each resin composition in pellet form was subjected to injection molding at a temperature of 340° C. to form a test piece having a length of 100 mm, a width of 10±0.5 mm, a thickness of 4±0.2 mm. The flexural strength of each test piece was measured by a method defined by JIS-K-7203. A target range of the flexural strength was set to 100 MPa or more.

6. Strength of guide pinholes

Figure 3:
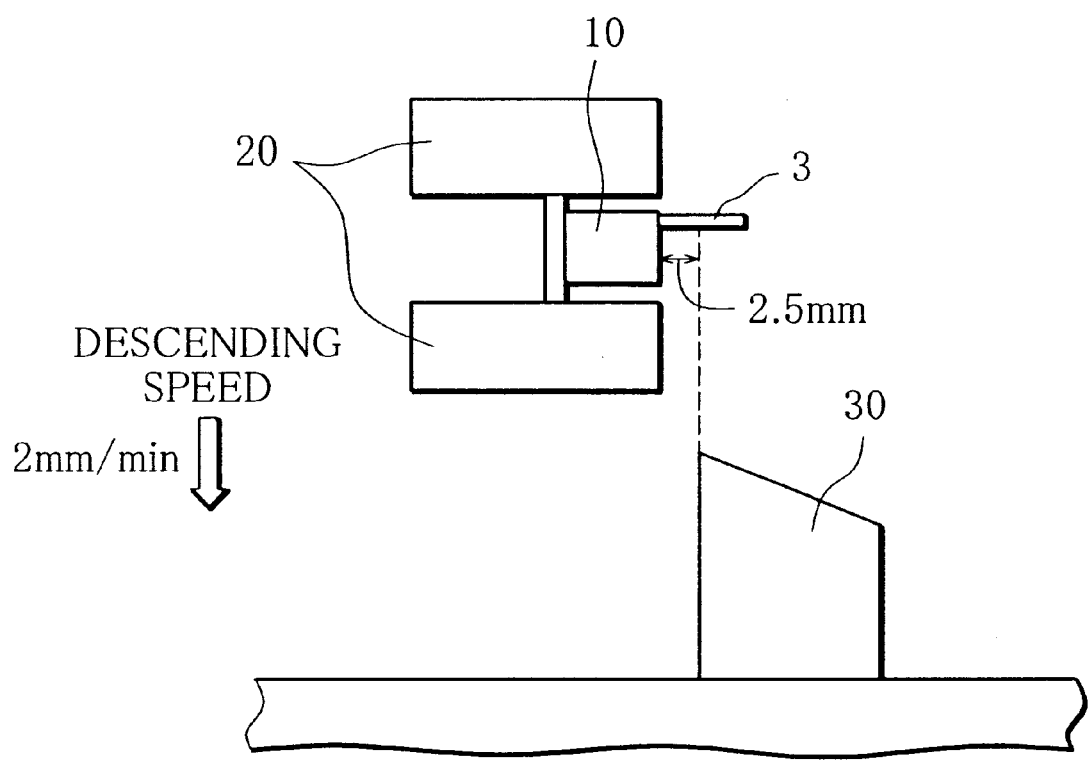
FIG. 3 is a schematic view showing a method of measuring strength of a guide pin hole of an MT-type ferrule.

Each resin composition in pellet form was subjected to injection molding at a temperature of 340° C. to form an optical ferrule body 1 illustrated in FIG. 2. A guide pin 3 was inserted into a guide pin hole 2 formed in the ferrule body 1 to a depth of 4 mm, thereby allowing the guide pin 3 to protrude from the ferrule body 1 by the remaining length. Then, the ferrule body 1 was held by a test piece holder 20 of a device shown in FIG. 3, and the test piece holder was allowed to fall at a speed of 2 mm/min. Then, a portion of the guide pin 3 at 2.5 mm away from the end face of the ferrule body 1 was caused to abut against an acute angle portion of a member 30 to measure a load when the guide pin hole 2 was broken, and the thus measured value was determined as the strength of the guide pin hole. A target range of strength of the guide pin hole was set to 19.6 N or higher.

7. Linear thermal expansion coefficient

From the above-described test pieces for use in the measurement of bend elastic constant, test pieces each having a length of 10 mm, a width of 5 mm, and a thickness of 4 mm were cut out. For each test piece, an average linear thermal expansion coefficient was calculated by a method defined by JIS-K-7197, at a temperature lower than 80° C. and equal to or lower than a glass transition temperature (Tg). A target range of the linear thermal expansion coefficient was set to $1.7 \times 10^{-6}$ [1/° C.] or lower.

Results of the above measurement are summarized in Table 2.

TABLE 2

| | Kind of resin composition | Rate of mold shrinkage (%) | Smoothness of end face (μm) | Length of protrusion (μm) | Bend elastic constant (× $10^4$ MPa) | Flexural strength (MPa) (N) | Strength of guide pin hole (N) | Coefficient of linear thermal expansion (× $10^{-6}$ [1/° C.]) Tg |
|---|---|---|---|---|---|---|---|---|
| Example 1 | $D_1$ | 0.60 | 0.3 | 4.0 | 1.86 | 150 | 24.50 | 1.70 |
| Example 2 | $D_2$ | 0.50 | 0.3 | 3.0 | 2.16 | 130 | 19.60 | 1.60 |
| Example 3 | $D_3$ | 0.50 | 0.3 | 2.7 | 2.10 | 130 | 23.52 | 1.60 |
| Example 4 | $D_4$ | 0.50 | 0.3 | 2.7 | 2.20 | 100 | 19.60 | 1.60 |
| Example 5 | $D_5$ | 0.50 | 0.3 | 3.0 | 2.00 | 130 | 21.56 | 1.60 |
| Example 6 | $D_6$ | 0.50 | 0.3 | 3.0 | 2.00 | 130 | 21.56 | 1.60 |
| Example 7 | $D_7$ | 0.50 | 0.3 | 1.0 | 2.10 | 110 | 20.58 | 1.60 |
| Example 8 | $D_8$ | 0.58 | 0.3 | 5.0 | 1.73 | 150 | 31.36 | 1.67 |
| Example 9 | $D_9$ | 0.50 | 0.4 | 4.0 | 2.08 | 100 | 15.68 | 1.60 |
| Comparative example 1 | $D_{10}$ | 0.70 | 0.7 | 2.5 | 1.48 | 140 | 39.20 | 1.7 |
| Comparative example 2 | $D_{11}$ | 0.70 | 0.8 | 2.2 | 1.55 | 136 | 33.32 | 1.59 |
| Comparative example 3 | $D_{12}$ | 0.65 | 0.7 | 1.5 | 1.58 | 133 | 29.40 | 1.5 |
| Comparative example 4 | $D_{13}$ | Melt viscosity is too high to perform injection molding | | | | | | |
| Comparative example 5 | $D_{14}$ | 0.70 | 0.3 | 4.0 | 1.50 | 160 | 35.28 | 1.83 |
| Comparative example 6 | $D_{15}$ | 0.65 | 0.3 | 3.8 | 1.58 | 160 | 33.81 | 1.78 |
| Comparative example 7 | $D_{16}$ | 0.70 | 0.5 | 2.5 | 1.55 | 130 | 28.71 | 1.7 |
| Comparative example 8 | $D_{17}$ | 0.58 | 0.5 | 2.3 | 1.78 | 130 | 25.97 | 1.36 |
| Comparative example 9 | $D_{18}$ | Melt viscosity is too high to perform injection molding | | | | | | |
| Comparative example 10 | $D_{19}$ | 0.50 | 0.9 | 1.8 | 1.80 | 110 | 26.26 | 1.5 |
| Comparative example 11 | $D_{20}$ | 0.68 | 0.5 | 4.0 | 1.59 | 150 | 27.44 | 1.91 |

From Tables 1 and 2, the following are obvious.

(1) First, the optical ferrule bodies of Comparative Examples 1–6, 8 and 9 molded from resin composition shaving a melt viscosity larger than 600 [Pa×sec.] are discussed, paying attention to the melt viscosity of these resin compositions. Comparative Examples 4 and 9 are too highly viscous to mold and hence not worthy to mention. As typically shown in Comparative Examples 1 to 3, the rates of mold shrinkage of these ferrule bodies are largely deviated from the target range, which means that the dimensional accuracy of the ferrule bodies is low. Further, these examples also show a degraded smoothness of the polished end faces and a short length of protrusion of an optical fiber, with the bend elastic constant thereof being much lower than the target range.

In the case of the resin composition (Comparative Example 11) having a melt viscosity of 270 [Pa×sec.], the smoothness of the end face and the length of protrusion of an optical fiber are within the respective target ranges. However, a ferrule body molded therefrom is large in the rate of mold shrinkage, and low in the bend elastic constant, and further the coefficient of linear thermal expansion is largely deviated from the target range, which means that this resin composition lacks dimensional stability as a whole.

From the above, the melt viscosity of a resin composition for use in injection molding of ferrules should be set to within a range of 300 to 600 [Pa×sec.].

(2) As compared to Examples 1–9 using resin compositions containing whisker, Comparative Examples 1–11, in which resin compositions containing no whisker are subjected to injection molding, each have a large variation in smoothness of the end face of a ferrule, tend to cause a shorter length of protrusion of an optical fiber and a large rate of mold shrinkage from which lowering of dimensional accuracy is noticeable. Also, the bend elastic constant is lowered. From the above, the usefulness of blending whisker is obvious.

(3) Examples 1–9, obtained by setting the blending ratio of spherical silica to the entire silica at 50–80 wt % (with the blending ratio of irregular-shaped silica set at 20–50 wt %), satisfy the requirement on all the properties of the resin composition.

On the other hand, Comparative Examples 7, 8 and 10 in which only irregular-shaped silica having an average particle diameter of 3.0 μm or larger is blended has a problem of shorter length of protrusion of an optical fiber.

The present invention is not limited to the foregoing Examples, and may be modified variously.

For instance, the resin composition for use as a molding material for optical ferrules may be comprised of a base resin, silica and whisker of types other than those mentioned in the Examples. Blending ratios of the silica and whisker to the base resin are not limited to those mentioned in the Examples.

What is claimed is:

1. An optical ferrule which is a molding of a resin composition and which has an optical fiber insertion hole and a polished connecting end face, the improvement comprising:

said resin composition containing, as essential constituents, a base resin, silica, and whisker; and said resin composition having a melt viscosity of 300 to 600 [Pa×sec.] when measured at a shear rate of 900 [1/sec.] at a temperature of 340° C. by using a capillary having a diameter of 0.1 mm and a depth of 30 mm, as defined by JIS-K-7199.

2. The optical ferrule according to claim 1, wherein said base resin is a linear polyphenylene sulfide resin.

3. The optical ferrule according to claim 2, wherein said resin composition comprises, by weight, 250 to 300 parts of silica and 10 to 70 parts of whisker relative to 100 parts of the linear polyphenylene sulfide resin.

4. The optical ferrule according to claim 1, wherein said silica in said resin composition is a mixture of spherical silica and irregular-shaped silica.

5. The optical ferrule according to claim 4, wherein blending ratio of the spherical silica and the irregular-shaped silica to said silica are 50 to 80% by weight and 20 to 50% by weight, respectively.

6. The optical ferrule according to claim 1, wherein said whisker is comprised of at least one material selected from a group consisting of potassium titanate, titanium oxide, magnesium hydroxide needles, wollastonite, xonotlite, dawsonite, and calcium carbonate needles.

7. The optical ferrule according to claim 1, wherein said whisker has an average fiber diameter of 5 to 20 µm, an average fiber length of 30 µm or less, and an aspect ratio of 10 or larger.

8. The optical ferrule according any one of claims 4–7, wherein said base resin is a linear polyphenylene sulfide resin, and 250 to 300 parts by weight of silica and 10 to 70 parts by weight of whisker are blended with 100 parts by weight of said linear polyphenylene sulfide resin in said resin composition.

\* \* \* \* \*